(12) United States Patent
Liang et al.

(10) Patent No.: US 10,785,620 B2
(45) Date of Patent: Sep. 22, 2020

(54) STREET LAMP INTEGRATION DEVICE, STREET LAMP SYSTEM AND COMMUNICATION METHOD

(71) Applicant: BOE TECHNOLOGY GROUP CO., LTD., Beijing (CN)

(72) Inventors: Yao Liang, Beijing (CN); Shuping Gai, Beijing (CN); Ying Wu, Beijing (CN); Huawei Yu, Beijing (CN); Shu Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/928,342

(22) Filed: Mar. 22, 2018

(65) Prior Publication Data

US 2019/0028864 A1    Jan. 24, 2019

(30) Foreign Application Priority Data

Jul. 24, 2017    (CN) .......................... 2017 1 0608130

(51) Int. Cl.
*H04W 4/44*    (2018.01)
*H04W 48/20*    (2009.01)
(Continued)

(52) U.S. Cl.
CPC .............. *H04W 4/44* (2018.02); *G08G 1/017* (2013.01); *G08G 1/04* (2013.01);
(Continued)

(58) Field of Classification Search
None
See application file for complete search history.

(56) References Cited

U.S. PATENT DOCUMENTS 5,839,085 A * 11/1998 Yoshikawa ............ G08G 1/015
701/117
8,866,636 B2 * 10/2014 Lee ...................... G08G 1/0104
340/905

(Continued)

FOREIGN PATENT DOCUMENTS

CN    105389981 A    3/2016
CN    106548646 A    3/2017

OTHER PUBLICATIONS

Second Office Action for Chinese Patent Application No. 201710608130.7 dated Jan. 6, 2020.
(Continued)

*Primary Examiner* — Yaotang Wang
(74) *Attorney, Agent, or Firm* — Calfee, Halter & Griswold LLP

(57) ABSTRACT

A street lamp integration device, a street lamp system and a communication method are disclosed. The street lamp integration device includes a local area network module configured to generate a local area network covering a first range, a traffic collector configured to collect traffic information in a second range and send the same to a communication module and the communication module configured to send the traffic information to a vehicle connected to the local area network. By extensive availability and close mutual distance of street lamps, a local area network is formed within the first range of each street lamp, which helps to to form a network of comprehensive coverage and extensive range. The traffic collector can collect traffic in a certain range and send the same to the vehicle connected to the local area network through the communication module, facilitating awareness of the current traffic by the vehicle.

18 Claims, 3 Drawing Sheets

(51) Int. Cl.
*H04W 48/04* (2009.01)
*H04W 4/46* (2018.01)
*G08G 1/0967* (2006.01)
*G08G 1/04* (2006.01)
*H04W 24/02* (2009.01)
*G08G 1/017* (2006.01)
*H04W 4/02* (2018.01)
*H04L 29/08* (2006.01)
*H04W 84/12* (2009.01)
*H04W 24/08* (2009.01)

(52) U.S. Cl.
CPC . *G08G 1/096708* (2013.01); *G08G 1/096783* (2013.01); *H04W 4/023* (2013.01); *H04W 4/027* (2013.01); *H04W 4/46* (2018.02); *H04W 24/02* (2013.01); *H04W 48/04* (2013.01); *H04W 48/20* (2013.01); *H04L 67/12* (2013.01); *H04W 24/08* (2013.01); *H04W 84/12* (2013.01)

(56) References Cited

U.S. PATENT DOCUMENTS

| | | | | |
|---|---|---|---|---|
| 9,020,762 | B2* | 4/2015 | Reich | G01C 21/32 701/117 |
| 9,439,121 | B2* | 9/2016 | Barreto De Miranda Sargento | H04W 36/14 |
| 9,918,001 | B2* | 3/2018 | Pisz | H04N 5/23206 |
| 10,122,790 | B2* | 11/2018 | Cardote | H04W 4/40 |
| 10,223,911 | B2* | 3/2019 | Modi | G06F 16/738 |
| 10,332,401 | B2* | 6/2019 | Zruya | G08G 1/0965 |
| 2011/0095908 | A1* | 4/2011 | Nadeem | B60H 3/00 340/905 |
| 2015/0066350 | A1* | 3/2015 | Iwata | G01C 21/3469 701/400 |
| 2016/0039436 | A1* | 2/2016 | Bhagwatkar | B64C 39/024 348/148 |
| 2018/0050800 | A1* | 2/2018 | Boykin | H04N 5/23206 |
| 2018/0262887 | A1* | 9/2018 | Futaki | H04W 48/20 |
| 2018/0301034 | A1* | 10/2018 | Morita | G08G 1/096725 |

OTHER PUBLICATIONS

Third Office Action for Chinese Patent Application No. 201710608130.7 dated Jun. 3, 2020.

* cited by examiner

STREET LAMP INTEGRATION DEVICE, STREET LAMP SYSTEM AND COMMUNICATION METHOD

RELATED APPLICATION

The present application claims right of priority of the Chinese patent application No. 201710608130.7 filed on Jul. 24, 2017, the entire disclosure of which is incorporated herein by reference.

TECHNICAL FIELD

The disclosure relates to the field of vehicle networking, particularly to a street lamp integration device, a street lamp system and a communication method.

BACKGROUND

The conventional definition of vehicle networking refers to a system that extracts and makes effective use of attribute information and static and dynamic information of all vehicles on an information network platform through electronic labels loaded on the vehicles by means of the identification technology such as RF, and performs effective monitoring to running states of all vehicles based on different functional requirements and provides comprehensive services. With the development of the vehicle networking technology and industry, the above definition is no longer capable of covering all contents of vehicle networking. According to the definition of Strategic Alliance of Technology Innovation of Vehicle Networking Industry, the vehicle networking is a large system network that takes in-vehicle network, the inter-vehicle network and the vehicular mobile internet as the basis and performs wireless communication and information interchange between vehicle-X (X: vehicle, road, pedestrian and internet etc.) according to the stipulated communication protocols and data interaction standards, is an integrated network that can realize intelligent traffic management, intelligent dynamic information service and vehicle intelligent control, and is a typical application of the technology of internet of things in the field of the traffic system.

Due to the numerousness of roads, the vehicle networking in the prior art has to construct a complex cloud platform, network devices and traffic detection devices dedicatedly to realize interconnection between vehicle and road or between vehicles better.

SUMMARY

Embodiments of the disclosure provide a street lamp integration device, a street lamp system and a communication method, to solve the problem that the vehicle networking in the prior art has to construct a cloud platform, network devices and traffic detection devices dedicatedly, which makes the whole structure complex.

According to an aspect of this disclosure, a street lamp integration device is provided, comprising: a local area network module, a traffic collector and a communication module. The local area network module can be configured for generating a local area network that covers a first range. The traffic collector can be configured for collecting traffic information in a second arrange and sending the traffic information to the communication module. The communication module can be configured for sending the traffic information to a vehicle connected to the local area network.

In an embodiment, the street lamp integration device can further comprise a controller. The controller can be configured for, if a vehicle in the first range matches a first condition, determining to connect the vehicle to the local area network.

In an embodiment, the controller is further configured for sending a first instruction to obtain the traffic information to the traffic collector, receiving the traffic information collected by the traffic collector, and sending the traffic information to the communication module.

In an embodiment, the communication module is further configured for receiving a first request to obtain the traffic information sent by the vehicle connected to the local area network, and sending the first request to the controller. The controller is further configured for receiving the first request sent by the communication module, and generating the first instruction based on the first request.

In an embodiment, the street lamp integration device can further comprise: a detector, configured for detecting a speed of a vehicle in the first range, and sending the speed of the vehicle to the controller. The controller is further configured for, if the speed of the vehicle is smaller than a speed threshold, determining to connect the vehicle to the local area network.

In an embodiment, the communication module is further configured for receiving a second request to be connected to the local area network sent by the vehicle in the first range, and sending the second request to the controller. The controller is further configured for generating a second instruction to detect a speed of the vehicle based on the second request, and sending the second instruction to the detector, so as to enable the detector to detect the speed of the vehicle based on the second instruction.

In an embodiment, the detector is further configured for detecting heights of all vehicles in the first range according to a preset frequency, and sending the heights of all vehicles to the controller. The controller is further configured for, if it is determined that a height of at least one vehicle is higher than a height threshold based on the heights of all vehicles sent by the detector, generating the first instruction.

In an embodiment, the controller is further configured for, after connecting a first vehicle and at least one second vehicle to the local area network, if it is determined that the first vehicle and the second vehicle meet a second condition, establishing a communication connection between the first vehicle and the second vehicle.

In an embodiment, the controller is further configured for generating a third instruction to detect a distance between the first vehicle and the second vehicle, and sending the third instruction to the detector. The detector is further configured for detecting a distance between the first vehicle and the second vehicle based on the third instruction sent by the controller, and sending the distance between the first vehicle and the second vehicle to the controller, so as to enable the controller to determine whether the first vehicle and the second vehicle meet the second condition based on the distance between the first vehicle and the second vehicle and the speeds thereof.

In an embodiment, the communication module is further configured for receiving a third request to establish a communication connection with at least one second vehicle connected to the local area network sent by the first vehicle connected to the local area network, and sending the third request to the controller. The third request contains identification of the second vehicle.

In an embodiment, the detector is further configured for, based on a fourth instruction to obtain identification of the vehicle connected to the local area network sent by the controller, detecting the identification of the vehicle connected to the local area network, and sending the identification to the controller. The controller is configured for sending the fourth instruction to the detector and sending the identification sent by the detector to the communication module.

In an embodiment, the controller is further configured for, if the vehicle is connected to the local area network, generating the fourth instruction. The communication module is further configured for broadcasting all the identifications sent by the controller in the local area network.

In an embodiment, the communication module is further configured for receiving a fourth request to obtain an identification of a vehicle connected to the local area network sent by a third vehicle, and sending the fourth request to the controller; sending the identification sent by the controller to the third vehicle. The controller is further configured for, before sending the fourth instruction to the detector, generating the fourth instruction based on the fourth request sent by the communication module.

In an embodiment, the street lamp integration device communicates with a device in a wide area network through the wide area network.

In an embodiment, the traffic collector is arranged at a position of the street lamp close to the top of the street lamp, and the traffic collector comprises a camera.

According to another aspect of this disclosure, a street lamp system is provided, comprising: a plurality of street lamps, a plurality of street lamp integration devices mounted on the plurality of street lamps respectively. The street lamp integration device can be any street lamp integration device as stated above. The first ranges covered by the local area networks of adjacent ones of the street lamp integration devices adjoin or at least partly coincide, the second ranges which can be collected by the traffic collectors of adjacent ones of the street lamp integration devices adjoin or at least partly coincide, and communication can be performed between any two of the street lamp integration devices.

According to another aspect of this disclosure, a communication method is provided, for use in any street lamp integration device as stated above. The communication method comprises: generating a local area network that covers a first range; connecting a vehicle in the first range to the local area network; collecting traffic information in a second range; sending the traffic information to a vehicle connected to the local area network.

In some embodiments of this disclosure, a local area network that covers a first range is generated by the local area network module, which can make use of the characteristics of wide distribution of the street lamps and small distance between adjacent street lamps, so as to form a network that covers a comprehensive and wide range. In addition, the traffic in a certain range can be collected by the traffic collector, and the traffic information can be sent to a vehicle connected to the local area network by the communication module, which is convenient for the vehicle to learn the current traffic. Moreover, the street lamp integration device is designed on the basis of the street lamp so as to implement the function of information interaction of the vehicle networking. Therefore, the configuration requirement and limitation of vehicle terminals are reduced, the communication mode and function are expanded, which is benefit for promoting realization of a low cost, multi-functional, convenient and safe vehicle networking intelligent traffic system.

The SUMMARY has introduced some concepts of the present invention in a simplified form, which will be further described in the following Detailed Description. The SUMMARY does not intend to provide essential features or substantive features of the claimed subject matters, nor intends to limit the scopes of the claimed subject matters. In addition, just as described herein, various other features and advantages can also be combined into these technologies as needed.

BRIEF DESCRIPTION OF THE DRAWINGS

In order to explain the technical solutions of some embodiments of the disclosure more clearly, the drawings to be used in describing the embodiments of the disclosure will be introduced briefly below. It should be aware that the drawings described below are only some embodiments of this disclosure. The ordinarily skilled person in the art can also obtain other drawings based on these drawings on the premise of not paying any inventive efforts. The other drawings also fall within the scope of the present invention.

DETAILED DESCRIPTION

In order to understand the objects, the technical solutions and the advantages of some embodiments more clearly, these embodiments will be described hereafter in more details in conjunction with the drawings and the specific implementations. It should be recognized that the embodiments described are a part of rather than all of the embodiments of the present invention. Based on the embodiments provided by this disclosure, the ordinary skilled person in the art can obtain other embodiments on the premise of not paying any inventive efforts. The other embodiments obtained all belong to the protection scope of the present invention.

Figure 1:
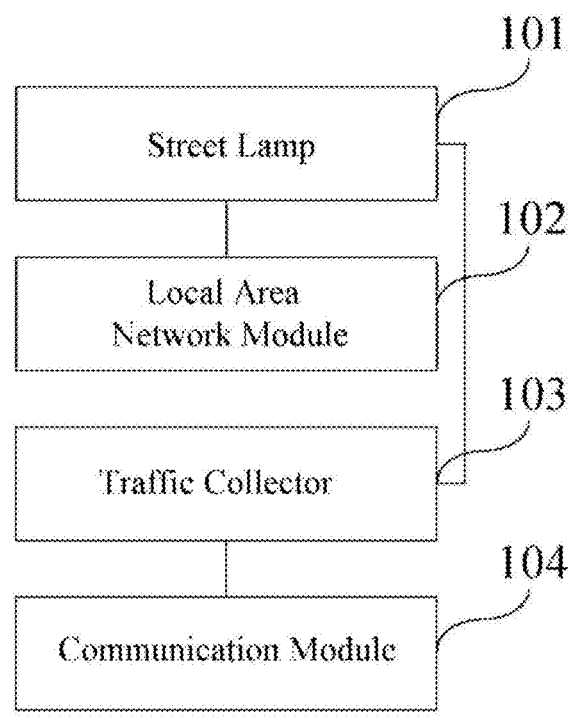
FIG. 1 is a structural block diagram of a street lamp integration device according to an embodiment of this disclosure.

FIG. 1 shows a structural block diagram of a street lamp integration device according to an embodiment of this disclosure. As shown in FIG. 1, the street lamp integration device can be arranged with a street lamp 101 together. The street lamp integration device can comprise: a local area network module 102, a traffic collector 103 and a communication module 104.

The local area network module 102 can be configured for generating a local area network that covers a first range. The local area network can cover certain road range. The first range generated by the local area network module 102 can be determined based on the distribution condition of the adjacent street lamps specifically, so that the first ranges of the local area networks generated by adjacent street lamp integration devices can be connected with each other without blind zone. In one embodiment, the first range can be a circular range taking the street lamp 101 as the center of the circle.

The traffic collector 103 can be configured for collecting traffic information in a second range and sending the traffic information to the communication module 104. The traffic information can be any information related to the traffic in the second range and can be in the form of a picture and/or video. The second range can be determined by device parameter of the traffic collector 103. The traffic collector 103 can be arranged at a position of the street lamp 101 close to the top of the street lamp, so that it will not be disturbed by high obstacles when collecting the traffic information. The traffic collector 103 can comprise a camera by which the traffic information can be collected.

The communication module 104 can be configured for sending the traffic information to a vehicle connected to the local area network.

The street lamp integration device generates a local area network that covers a first range through the local area network module 102, which can make use of the characteristics of wide distribution of the street lamps 101 and small distance between adjacent street lamps 101, so as to form a network that covers a comprehensive and wide range. In addition, the traffic in a certain range can be collected by the traffic collector 103. In one embodiment, as long as the vehicle enters the first range, it can be connected to the local area network automatically, so as to establish communication connection with the street lamp integration device, thereby obtaining the traffic information collected by the traffic collector 103 from the communication module 104. After the traffic information is obtained, the driver of the vehicle can make corresponding strategy selection based on the traffic information, for example, reselecting a travel route etc. Similarly, a passenger of the vehicle can also take next action based on the traffic information, for example, continue to wait in the car, or, for example, choose to get off and walk in the case of a serious accident ahead.

In one embodiment, the street lamp integration device is designed on the basis of the street lamp 101 so as to implement the function of information interaction of the vehicle networking. Therefore, the configuration requirement and limitation of vehicle terminals are reduced, the communication mode and function are expanded, which is benefit for promoting realization of a low cost, multifunctional, convenient and safe vehicle networking intelligent traffic system. Hence, the vehicle can receive the traffic information as long as a corresponding communication device is arranged therein.

Figure 2:
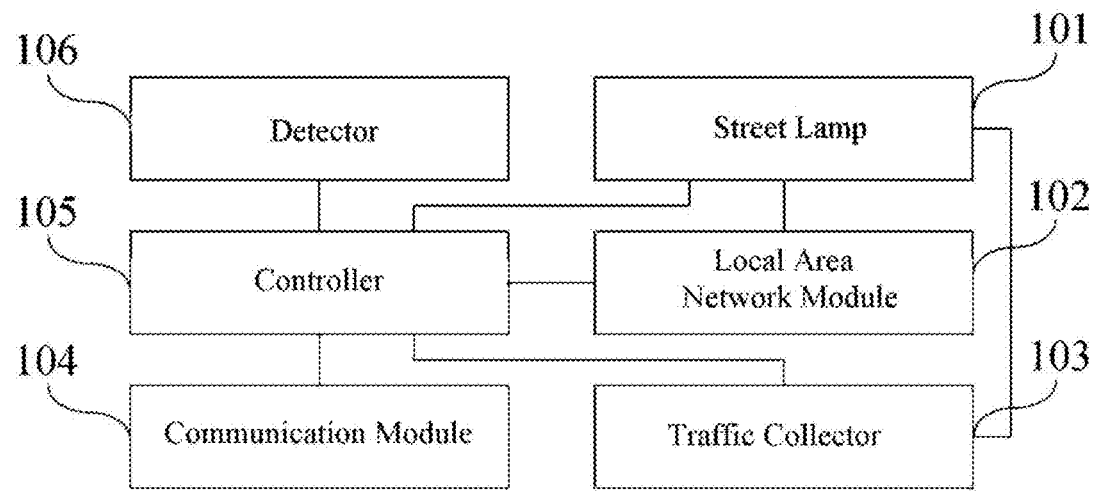
FIG. 2 is another structural block diagram of a street lamp integration device according to an embodiment of this disclosure.

FIG. 2 shows another structural block diagram of a street lamp integration device according to an embodiment of this disclosure. As shown in FIG. 2, for the convenience of communication connection between the above modules or components, the street lamp integration device can further comprise: a controller 105. The controller 105 can be a chip with the data processing function.

The controller 105 can be configured for sending a first instruction to obtain the traffic information to the traffic collector 103, receiving the traffic information collected by the traffic collector 103, and sending the traffic information to the communication module 104. The controller 105 can be used to analyze the instruction and information so as to transmit the instruction and information between the traffic collector 103 and the communication module 104, so as to the communication between the traffic collector 103 and the communication module 104 to be smooth.

In one embodiment, the controller 105 can be further configured for determining whether the vehicle in the first range matches a first condition, and determining to collect the vehicle to the local area network if yes. Otherwise, the vehicle cannot be connected to the local area network. The first condition can be set specifically based on different circumstances. Hence, the street lamp integration device can make selection to the vehicles that enter the first range through the controller 105, and connect the vehicles that meet the first condition to the local area network initiatively.

In consideration of safety, if the speed of a vehicle is too high, it is not suitable to connect it to the local area network, so as to avoid danger caused by inattention when the driver performs information interaction through the local area network. In addition, it requires time to connect the vehicle to the local area network. If the speed of the vehicle is too high, the vehicle will quickly pass through the first range covered by the local area network of the street lamp integration device, thus it will be unnecessary for the vehicle to be connected to the local area network of the street lamp integration device. Hence, in one embodiment, the speed of the vehicle is to be detected so as to determine whether the vehicle will be connected to the local area network by assessing the speed. In such a case, the first condition can be set as the speed of the vehicle being smaller than a speed threshold. By determining whether the speed of a vehicle matches the first condition, a vehicle at a too high speed cannot be connected to the local area network.

Specifically, as shown in FIG. 2, the street lamp integration device can further comprise: a detector 106. The detector 106 can be configured for detecting a speed of a vehicle in the first range, and sending the speed of the vehicle to the controller 105. The controller 105 can be configured for, if it is determined that the speed of the vehicle sent by the detector 106 matches the first condition, determining to connect the vehicle to the local area network. Hence, even if a vehicle enters the range of the local area network generated by the street lamp 101, the vehicle will not necessarily be connected to the local area network. The vehicle can be connected to the local area network only when the speed of the vehicle is smaller than the speed threshold.

In one embodiment, the detector 106 can detect the speed of a vehicle that enters in the first range initiatively, the controller 105 does not have to send an instruction to indicate the detector 106 to perform detection. The controller 105 can connect a vehicle that is located in the first range and meets the first condition into the local area network initiatively without requiring the vehicle to make a request.

In another embodiment, the street lamp integration device will make judgment so as to determine whether a vehicle can be connected to the local area network only when the vehicle that enters the first range makes a request. Specifically, the communication module 104 can be configured for receiving a second request to be connected to the local area network sent by the vehicle in the first range, and sending the second request to the controller 105. In actual applications, the driver or a passenger of the vehicle can edit and send the second request through a communication device of the vehicle. The controller 105 can be configured for generating a second instruction to detect the speed of the vehicle based on the second request, and sending the second request to the detector 106, so as to enable the detector 106 to detect the speed of the vehicle based on the second instruction.

In this embodiment, the detector 106 will not detect the speed of the vehicle that enters the first range initiatively, only after the vehicle that enters the first range sends a second request to be connected to the local area network to the communication module 104 initiatively, will the controller 105 generate a second instruction to detect the speed of the vehicle based on the second request sent by the communication module 104, and send the second instruction to the detection 106, and then, will the detector 106 detect the speed of the vehicle that has sent the second request based on the second instruction, so as to facilitate the controller 105 to determine whether the vehicle meets the first condition for connection to the local area network.

After a vehicle is connected to the local area network of a street lamp integration device, the vehicle can obtain the traffic information through the street lamp integration device. There are two manners for the vehicle to obtain the traffic information through the street lamp integration device: one is that the vehicle sends a request to obtain the traffic information to the street lamp integration device initiatively, and the other is that the street lamp integration device sends the traffic information to the vehicle initiatively.

With regard to the manner that the vehicle sends a request to obtain the traffic information to the street lamp integration device initiatively, the modules or components of the street lamp integration device can perform the following operations or functions:

The communication module 104 can be configured for receiving a first request to obtain the traffic information sent by the vehicle connected to the local area network, and sending the first request to the controller 105. In actual applications, the driver or a passenger of the vehicle can edit and send the first request through a communication device of the vehicle.

The controller 105 can be configured for receiving a first request sent by the communication module 104 and generating a first instruction based on the first request.

In this manner, after the communication module 104 sends the traffic information, it stops sending traffic information to the vehicle. Or, the vehicle sends a termination instruction to the communication module 104, the communication module 104 sends the instruction to the controller 105, and the controller 105 controls the traffic collector 103 to stop sending traffic information to it, so as to stop sending the traffic information to the vehicle. In actual application, the driver or a passenger of the vehicle can edit and send the termination instruction through a communication device of the vehicle.

In this embodiment, a first request of the vehicle is received through the communication module 104, and the controller 105 generates a first instruction based on the first request, so that the controller 105 can send the first instruction to the traffic collector 103 to obtain the traffic information. In this manner, no matter whether there is a cart in front of the vehicle to block the sight line, the traffic information can be obtained as long as the vehicle sends the first request.

With regard to the manner that the street lamp integration device sends the traffic information to the vehicle initiatively, there may be the following two manners: the first manner is that the street lamp integration device will send the traffic information to the vehicle initiatively as long as a vehicle is connected to the local area network; the second manner is that only when there is a vehicle in the first range of the street lamp integration device that meets certain conditions, will it send the traffic information to the vehicle connected to the local area network.

Specifically, with regard to the first manner of sending traffic information initiatively, the modules or components of the street lamp integration device perform the following operations or functions:

The controller 105 can be configured for, if the vehicle is connected to the local area network, generating a first instruction.

The traffic collector 103, after receiving the first instruction sent by the controller 105, will send the traffic information to the controller 105, and send the traffic information to the vehicle connected to the local area network through the communication module 104.

In this manner, the communication module 104 can stop sending traffic information to the vehicle after the traffic information has been sent.

In this embodiment, as long as a vehicle is connected to the local area network, the controller 105 will generate a first instruction initiatively, so as to send the first instruction to the traffic collector 103 to obtain the traffic information without requiring the vehicle connected to the local area network to meet any condition nor requiring other vehicles in the first range to meet any condition.

With regard to the second manner of sending traffic information initiatively, the modules or components of the street lamp integration device perform the following operations or functions:

The detector 106 can be configured for detecting heights of all vehicles in the first range according to a preset frequency, and sending the heights of all vehicles to the controller 105. The preset frequency can be determined based on the traffic in the first range, so as to avoid too frequent detection which results in large consumption to the street lamp integration device, and also avoid too long time interval between two successive detections such that the traffic information cannot be sent to the vehicle timely.

The controller 105 can be configured for, if it is determined that the height of at least one vehicle is higher than a height threshold based on the heights of all vehicles sent by the detector 106, generating a first instruction. The height threshold can be set based on the conditions of most of the vehicles. For example, for most of the vehicles, when the height of the vehicle in front of them reaches the height of a bus, the traffic ahead will not be observed, for example, the traffic light cannot be seen, hence, the height of a bus can be set as the height threshold.

In this manner, the communication module 104 can stop sending the traffic information to the vehicle after the traffic information has been sent. Or, in the process of sending the traffic information, the controller 105 determines that the none of the heights of all vehicles detected by the detector 106 is higher than the height threshold, it indicates that there is no obstacle in the first range that blocks the sight line of the driver, thus the controller 105 controls the traffic collector 103 to stop sending the traffic information to it, thereby being capable of stopping sending traffic information to the vehicle, so as to reduce consumption of the street lamp integration device.

In this embodiment, the detector 106 detects the heights of all vehicles in the first range, if the height of a vehicle is higher than the height threshold, the controller 105 will generate a first instruction initiatively so as to send the first instruction to the traffic collector 103 to obtain the traffic information. In this manner, when the heights of a vehicle in the first range are higher than the height threshold, the street lamp integration device will send the first instruction to vehicles connected to the local area network initiatively, thereby avoiding hidden danger caused by relatively high vehicles blocking the sight lines of the drivers of other vehicles.

No matter in the above manner that the vehicle sends a request to obtain the traffic information to the street lamp integration device initiatively or in the manner that the street lamp integration device sends the traffic information to the vehicle initiatively, the vehicle can obtain the traffic information from the street lamp integration device. Particularly, when there is a cart (e.g., a bus, a truck) in front of the vehicle that blocks the sight line and the specific blocked traffic cannot be seen, the vehicle can obtain the specific traffic information blocked by the front cart collected by the traffic collector 103, so as to improve safety. The driver of the vehicle can make selection and perform switching of the above manners of obtaining the traffic information based on specific requirements. Certainly, in actual applications, a passenger of the vehicle can also perform the operations of selection and switching based on specific requirements.

In situations such as traffic jams or traffic accidents, a driver or passenger of a vehicle generally hopes to perform information interaction with the drivers or passengers of the vehicles around, so as to obtain related traffic information timely. In the prior art, if no communication connection is established between drivers or passengers through such as a social software in advance, in order to realize instant messaging, it is generally required to join in a same cloud platform through registration to establish communication connection. In this manner, it cannot be disconnected immediately after the communication is completed, personal privacy may be easily leaked, and the manner of joining by registration is also relatively complex. In order to join the cloud platform, an ad hoc network terminal with a high cost has also to be mounted in a vehicle.

Therefore, in order to solve the above problem, the street lamp integration device in some embodiments of this disclosure further provides a function of enabling instant messaging between the vehicles that are connected to the local area network of the street lamp integration device.

In one embodiment, the controller 105 can be configured for, after connecting a first vehicle and at least one second vehicle to the local area network, if it is determined that the first vehicle and the second vehicle meet a second condition, establishing communication connection between the first vehicle and the second vehicle. The second condition can be set based on specific circumstances.

A communication connection can be established between the first vehicle and the second vehicle by determination of the controller 105 on whether the first vehicle and the second vehicle that are connected to the local area network meet the second condition.

In one embodiment, the second condition is that the distance between the first vehicle and the second vehicle is smaller than a distance threshold, and the speeds of the first vehicle and the second vehicle are both smaller than a speed threshold. The second condition on the one hand can avoid a too large distance between the first vehicle and the second vehicle so as to ensure a smooth communication connection, on the other hand, since it requires time to establish communication, it can avoid the case that the first vehicle or the second vehicle has left the first range before the communication connection is established due to too high speeds of the first vehicle and the second vehicle, and also avoid hidden danger.

In one embodiment, the street lamp integration device can detect whether the vehicle connected to the local area network meets the second condition initiatively.

When the second condition is that the distance between the first vehicle and the second vehicle is smaller than a distance threshold, and the speeds of the first vehicle and the second vehicle are both smaller than a speed threshold, the controller 105 can be configured for, after connecting the first vehicle and at least one second vehicle to the local area network, generating a third instruction to detect the distance between the first vehicle and the second vehicle, and sending the third instruction to the detector 106.

The detector 106 can be configured for detecting the distance between the first vehicle and the second vehicle based on the third instruction sent by the controller 105, and sending the distance between the first vehicle and the second vehicle to the controller 105, so as to enable the controller 105 to determine whether the first vehicle and the second vehicle meet the second condition based on the distance between the first vehicle and the second vehicle and the speeds thereof. In one embodiment, the detector can detect the distances from the first vehicle and the second vehicle to the street lamp integration device and their orientation relationships with regard to the street lamp integration device by laser ranging, and obtain the distance between the first vehicle and the second vehicle using the trigonometric function.

In one embodiment, as long as at least two vehicles are connected to the local area network, the controller 105 will initiatively indicate the detector 106 to detect the distance between the vehicles, and determine whether the distance meets the second condition, so as to determine whether a connection can be established between the vehicles.

In another embodiment, the street lamp integration device will not determine whether the vehicle connected to the local area network meets the second condition initiatively, instead, only when the vehicle needs to establish a communication connection with other vehicles, and the vehicle sends a request to establish connection to the street lamp integration device initiatively, will the street lamp integration device determine whether a connection can be established.

Specifically, the communication module 104 can be further configured for receiving a third request to establish a communication connection with at least one second vehicle connected to the local area network sent by the first vehicle connected to the local area network, and sending the third request to the controller 105, so as to enable the controller 105 to send a third instruction to the detector 106 based on the request. In actual applications, the driver or passenger of the vehicle can edit and send the third request through a communication device of the vehicle.

The third request can contain the identification of the second vehicle. Each vehicle has an unique identification, hence, different vehicles can be distinguished through the identification. For example, the identification can be the plate number of the vehicle. Therefore, the identification of the second vehicle can be obtained by receiving the third request through the communication module 104, so that the street lamp integration device can establish a communication connection between the first vehicle and the second vehicle.

It should be understood that when a vehicle sends information to other vehicles after communication connection is established between the vehicles by the street lamp integration device, the sending vehicle sends the information to the street lamp integration device, and the street lamp integration device then forwards the information to the receiving vehicle. Hence, the information will also carry the identifications of the sending vehicle and the receiving vehicle, so that the street lamp integration device can send the information to the corresponding receiving vehicle based on the identification, and the receiving vehicle can feed back information to the corresponding sending vehicle. In actual applications, the driver or passenger of the vehicle can edit and send the information to be sent through a communication device of the vehicle.

By accessing to or disconnecting from the street lamp integration device, instant connection with other vehicles can be realized when communication is required, and the street lamp integration device can be disconnected when the communication demand is canceled.

Thus inconvenience and danger brought by the conventional interaction manners e.g., honking, speaking loudly etc., are avoided, and the inconvenience of joining the same cloud platform by registration and the problem of privacy leakage are also avoided. For the vehicle, it also does not have to provide the ad hoc network terminal thereon so as to save expenses of the vehicles.

For the identification of the vehicle, the street lamp integration device can implement the function of obtaining the identification of the vehicle in the following way.

Specifically, the controller 105 can be configured for sending a fourth instruction to the detector 106. The detector 106 can be configured for detecting the identification of the vehicle connected to the local area network based on the fourth instruction to obtain the identification of the vehicle connected to the local area network sent by the controller 105, and sending the identification to the controller 105. The controller 105 can be further configured for sending the identification sent by the detector 106 to the communication module 104.

The identification of the vehicle connected to the local area network can be obtained through the detector 106, such that when the vehicle sends a request to establish a connection with other vehicle, or, communicates with other vehicles through the street lamp integration device after establishing a connection with other vehicles, the identifications of other vehicles can be carried in the request or the communication information, so that the street lamp integration device can learn with which of the other vehicles the connection should be established or the communication should be performed.

In one embodiment, the controller 105 can be configured for, if the vehicle is connected to the local area network, generating a fourth instruction. The communication module 104, after receiving the identification, can be configured for broadcasting all the identifications sent by the controller 105 in the local area network. Hence, by the controller 105, the fourth instruction will be generated as long as the vehicle is connected to the local area network, so as to enable the detector 106 to obtain the identification of the vehicle initiatively, and through the communication module 104 the identification will be broadcasted by manner of broadcasting, such that other vehicles can receive these identifications as long as they are connected to the local area network.

In another embodiment, the communication module 104 can be configured for receiving a fourth request to obtain the identification of the vehicle connected to the local area network sent by a third vehicle, and sending the fourth request to the controller 105. In actual application, the driver or passenger of the vehicle can edit and send the fourth request through a communication device of the vehicle.

The controller 105 can be configured for generating a fourth instruction based on the fourth request sent by the communication module 104. The communication module 104, after receiving the identification, can be further configured for sending the identification sent by the controller 105 to the third vehicle.

Therefore, in this embodiment, only when the vehicle sends a request to the street lamp integration device, will the street lamp integration device send the identifications of other vehicles to the vehicle that sends the request.

In one embodiment, the street lamp integration device can also communicate with a device in a wide area network through the wide area network. By connecting the street lamp integration device to the wide area network, more information sent by a device in the wide area network can be obtained, thereby facilitating obtaining traffic information of a larger range.

Figure 3:
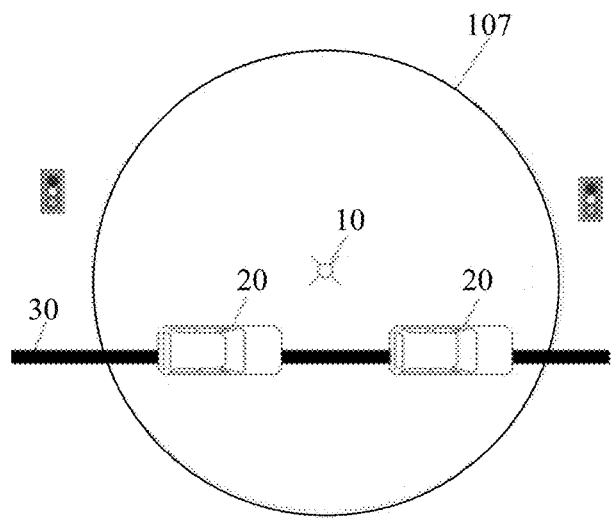
FIG. 3 is a schematic view of application of a street lamp integration device according to an embodiment of this disclosure.

FIG. 3 shows a schematic view of application of a street lamp integration device according to an embodiment of this disclosure. As shown in FIG. 3, the street lamp integration device 10 generates a local area network 107. The vehicle 20 running on the road 30, after entering the first range covered by the local area network 107, can be connected to the local area network 107, obtain the traffic information, and communicate with other vehicles 20.

To sum up, the street lamp integration device according to one or more embodiments of this disclosure can generate a local area network and connect the vehicle to the local area network by using the existing street lamps paved beside roads, traffic information can also be collected, so as to enable the vehicle connected to the local area network to obtain the traffic information, and communication connection can be established between the vehicles connected to the local area network, so as to avoid inconvenience and danger brought by conventional interaction manners and avoid inconvenience of joining the same cloud platform by registration and the problem of privacy leakage. In addition, it can also establish a communication connection with a wide area network to obtain more information, so as to provide it to the vehicle connected to the local area network. Therefore, the street lamp integration device has low cost, rich functions and high security. Moreover, the street lamp integration device is designed on the basis of the street lamp so as to implement the function of information interaction of the vehicle networking. Therefore, the configuration requirement and limitation of vehicular terminals of vehicles are reduced, the communication mode and function are expanded, which is beneficial for promoting realization of a low cost, multi-functional, convenient and safe vehicle networking intelligent traffic system.

According to another aspect of this disclosure, a street lamp system is provided. The street lamp system comprises: a plurality of street lamps, and a plurality of street lamp integration devices mounted on the plurality of street lamps respectively. The specific structure of the street lamp integration device can make reference to any of the multiple embodiments described previously, which will not be repeated here.

The first ranges covered by the local area networks of adjacent street lamp integration devices adjoin or at least partly coincide, such that as long as an area has a street lamp system, the area is covered by a local area network without network blind zone, and in this area a vehicle can keep communication with the street lamp system. For example, for circular first ranges, adjoining means tangency of two first ranges. For a quadrangular first ranges, adjoining means that adjacent edges of two adjacent first ranges coincide.

The street lamp system is constituted by a plurality of street lamp integration devices. Because street lamps are paved beside roads on a large scale, the network covers a comprehensive and wide range.

The second ranges that can be collected by the traffic collectors of adjacent street lamp integration devices adjoin or at least partly coincide, so that the range of traffic information collected by the street lamp system will not have blind zones, so as to collect the traffic information more completely. For second ranges, the meaning of adjoining is same as the first ranges, which will not be repeated here.

In one embodiment, any two street lamp integration devices in the street lamp system can communicate with each other, so as to expand the range of information that can be obtained by each street lamp integration device, thereby being capable of providing more abundant traffic information for the vehicles in an area controlled by the street lamp integration device.

Figure 4:
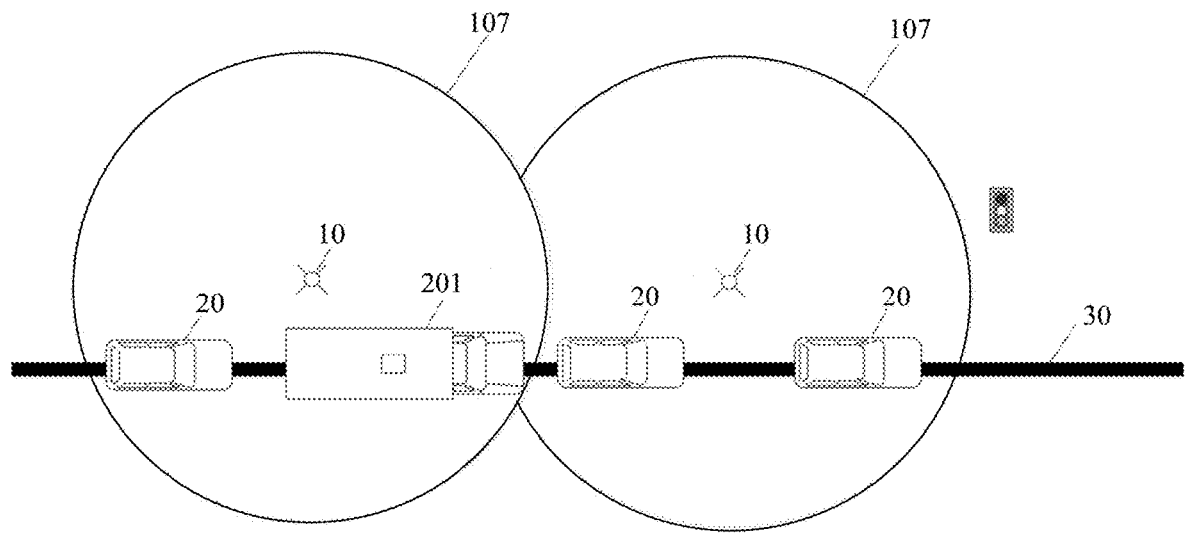
FIG. 4 is a schematic view of application of a street lamp system according to an embodiment of this disclosure.

FIG. 4 shows a schematic view of application of a street lamp system according to an embodiment of this disclosure. As shown in FIG. 4, the street lamp system comprises a street lamp integration device 10. The street lamp integration device 10 generates a local area network 107. The first ranges covered by the local area networks 107 between adjacent street lamp integration devices 10 shown by FIG. 4 partly coincide. The vehicle 20 running on the road 30, after entering the first range covered by the local area network 107, can be connected to the local area network 107, obtain the traffic information, and communicate with other vehicles 20. For example, FIG. 4 shows a cart 201 that can block the sight line. The vehicle 20 behind the cart 201 can obtain the traffic information through the street lamp system, it can avoid the case of failing to obtain the traffic information timely due to blocking of the cart 201 so as to avoid hidden danger.

To sum up, the street lamp system provided by one or more embodiments of this disclosure can generate a local area network that covers a comprehensive and wide range by using street lamps paved beside roads on a large scale, and collect a comprehensive and wide range of traffic information. Each street lamp integration device of the street lamp system can send traffic information to a vehicle connected to the local area network of the street lamp integration device, and establish a communication connection between vehicles, so as to avoid inconvenience and danger brought by conventional interaction manners and avoid inconvenience of joining the same cloud platform by registration and the problem of privacy leakage. In addition, a communication connection can be established between the street lamp integration devices of the street lamp system, each street lamp integration device can also establish a communication connection with a wide area network to obtain more information, so as to provide it to a vehicle connected to the local area network. Therefore, the street lamp system has low cost, rich functions and high security. Moreover, the street lamp system is designed on the basis of the street lamp so as to implement the function of information interaction of the vehicle networking. Therefore, the configuration requirement and limitation of vehicle terminals are reduced, communication modes and functions are expanded, which is benefit for promoting realization of a low cost, multi-functional, convenient and safe vehicle networking intelligent traffic system.

Figure 5:
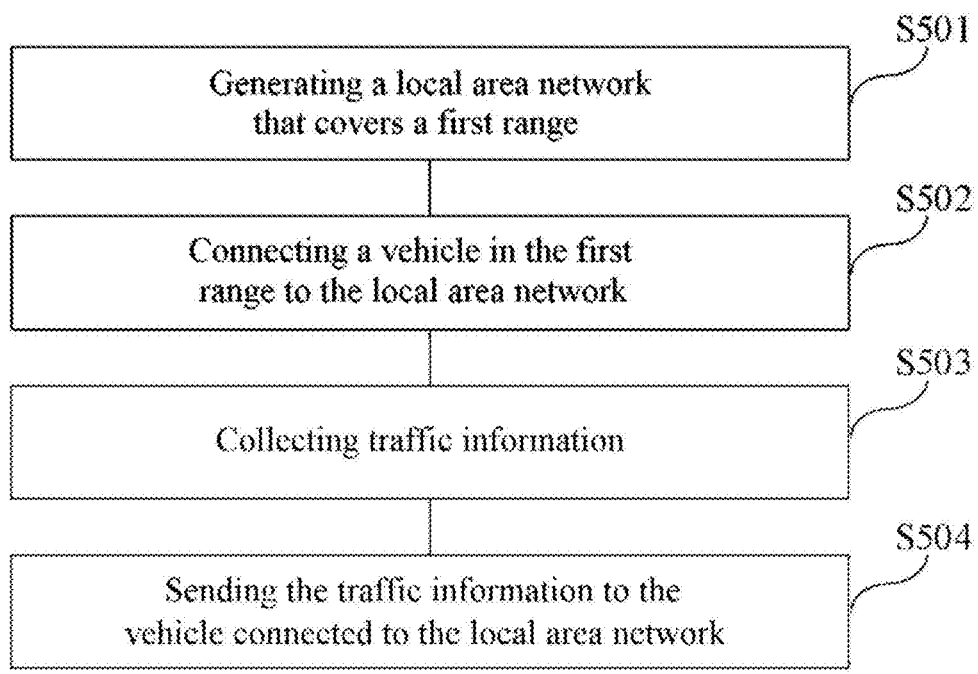
FIG. 5 is a flow chart of a communication method according to an embodiment of this disclosure.

FIG. 5 shows a flow chart of a communication method according to an embodiment of this disclosure. The communication method can be used in the street lamp integration device stated in some embodiments of this disclosure. As shown in FIG. 5, the communication method can comprise the following steps S501-S504.

Step S501: generating a local area network that covers a first range.

Step S502: connecting a vehicle in the first range to the local area network.

In some embodiments, the step S502 can connect the vehicle that enters into the first range to the local area network, or, connect the vehicle that enters the first range and meets the first condition (e.g., the speed of the vehicle is smaller than the speed threshold) to the local area network initiatively; or, connect the vehicle that meets the first condition to the local area network after the vehicle that enters the first range sends a request to be connected to the local area network.

Step S503: collecting traffic information in a second range.

Step S504: sending the traffic information to the vehicle connected to the local area network.

In some embodiments, the step S504 can send the traffic information to the vehicle that sends the request after the vehicle connected to the local area network sends a request to obtain the traffic information; or, can send the traffic information to the vehicle initiatively after the vehicle is connected to the local area network, or, can send the traffic information to all vehicles connected to the local area network after it is detected that the height of at least one vehicle in the first range is higher than the height threshold.

Through the above steps, the communication method can generate a local area network so as to connect a vehicle to the local area network, thereby being capable of sending traffic information to the vehicle connected to the local area network, so that the vehicle can avoid risks etc. based on the traffic information.

In some embodiments, after step S504, when the traffic information is sent, it stops sending traffic information to the vehicle, or, the vehicle sends a termination instruction to the street lamp integration device, so that the street lamp integration device stops sending traffic information to it, or, when none of the heights of all vehicles in the first range is higher than the height threshold, the street lamp integration device stops sending traffic information to the vehicle.

Figure 6:
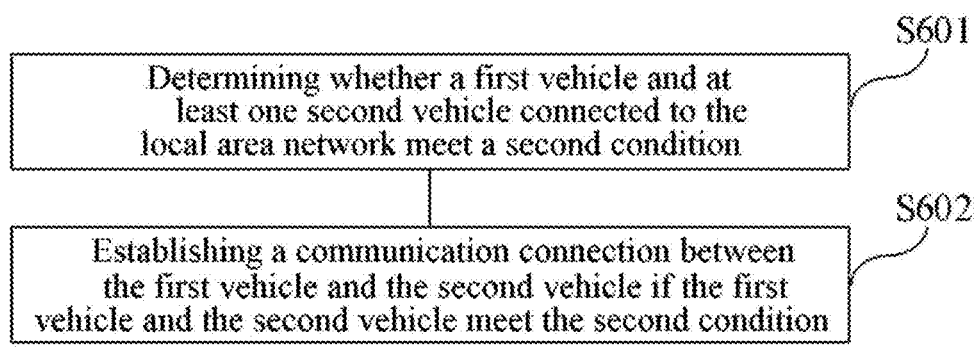
FIG. 6 is a flow chart of steps of establishing communication connection between vehicles of the communication method according to an embodiment of this disclosure.

In one embodiment, for at least two vehicle connected to the local area network, the communication method can further comprise establishing a communication connection between the at least two vehicles. FIG. 6 shows a flow chart of steps of establishing communication connection between the vehicles of the communication method according to an embodiment of this disclosure. As shown in FIG. 6, the communication method can further comprise steps S601-S602.

Step S601: determining whether the first vehicle and at least one second vehicle connected to the local area network meet the second condition.

The second condition can be set based on specific circumstances. For example, the second condition can be that the distance between the first vehicle and the second vehicle is smaller than a distance threshold, and the speeds of the first vehicle and the second vehicle are both smaller than a speed threshold.

In some embodiments, this step can determine whether the second condition is met between any vehicles connected to the local area network initiatively, or, only after the first vehicle connected to the local area network sends a request to establish a communication connection with at least one second vehicle connected to the local area network, will it determine whether the second condition is met between the first vehicle connected to the local area network and the second vehicle corresponding to the request.

Step S602: establishing a communication connection between the first vehicle and the second vehicle if the first vehicle and the second vehicle meet the second condition.

After the first vehicle and the second vehicle establish a communication connection, information interaction can be performed through the street lamp integration device.

To sum up, the communication method according to one or more embodiments of this disclosure can connect a vehicle to the local area network generated by the street lamp integration device, and can send traffic information to the vehicle connected to the local area network. In addition, it can establish a communication connection between vehicles connected to the same local area network, so as to enable the vehicle to obtain abundant information through the street lamp integration device and other vehicles, which is benefit for improving traffic safety. Moreover, the street lamp integration device to which the communication method is applied is designed on the basis of the street lamp so as to implement the function of information interaction of the vehicle networking. Therefore, the configuration requirement and limitation of vehicle terminals are reduced, communication modes and functions are expanded, which is benefit for promoting realization of a low cost, multi-functional, convenient and safe vehicle networking intelligent traffic system. There is less limitation for applying the communication method, which can be widely applied in vehicle and vehicle networking intelligent traffic system.

The embodiments herein are all described in a progressive way, each embodiment stresses the differences from other embodiments, and the same or similar portions between the embodiments can make reference to each other.

It should be noted that the above embodiments only exemplify division of the functional modules. In actual applications, said functions can be implemented by different functional modules as needed. The internal structure of the device can be divided into different functional modules so as to implement all or part of the functions described above. In addition, the function of one of the above modules can be implemented by multiple modules, and the functions of the multiple modules can also be implemented by one integrated module.

Finally, it should be further noted that the relation terms such as first and second herein are only used for distinguishing one entity or operation from another entity or operation, and are only used for identifying different entities or operations, not necessarily requiring or implying presence of any such actual relation or order between these entities or operations. Moreover, the term "comprise", "include" or any other variants intends to cover nonexclusive inclusion, thereby enabling a process, a method, an article or a terminal device comprising a series of elements to not only comprise those element but also comprise other elements not explicitly listed, or further comprise elements inherent for the process, the method, the article or the terminal device. In the case of no more limitations, the element defined by the wording "comprising a . . . " does not exclude presence of another same element in the process, the method, the article or the terminal device comprising said element.

It could be understood that what are stated above are only exemplary embodiments of the present invention, however, the protection scope of the present invention is not limited to this. It should be pointed out that on the premise of not departing from the spirit and the principle of the present invention, the ordinarily skilled person in the art can easily think of various modifications or replacements. All of these modifications or replacements should be covered within the protection scope of the present invention. Therefore, the protection scope of the present invention should be subject to the protection scopes of the claims attached.

In the Claims, none of the reference signs placed in parentheses should be interpreted as limitation to the claims. The term "comprise" does not exclude presence of elements or steps in addition to the elements or steps listed in the claims. The word "a" or "one" before the element does not exclude presence of multiple such elements. The present invention can be carried out by means of hardware comprising several separated elements, and can also be carried out through appropriately programmed software or firmware, or be carried out through any combination thereof.

In an apparatus or system claim in which several devices are listed, one or more of these devices can be embodied in an identical hardware item. The fact that only some measures are recited in mutually different dependent claims does not indicate that the combination of these measures cannot be advantageously utilized.

What is claimed is:

1. A street lamp integration device, comprising: a local area network device comprising hardware, a traffic collector and a communication device comprising hardware; wherein,
   the local area network device is configured for generating a local area network that covers a first range;
   the traffic collector is configured for collecting traffic information in a second range and sending the traffic information to the communication device;
   the communication device is configured for sending the traffic information to a vehicle connected to the local area network;
   wherein the street lamp integration device further comprises:
   a controller configured for sending a first instruction to the traffic collector to obtain the traffic information; and
   a detector configured for detecting heights of all vehicles in the first range according to a preset frequency, and sending the heights of all vehicles to the controller;
   wherein the controller is further configured for, if it is determined that a height of at least one vehicle is higher than a height threshold based on the heights of all vehicles sent by the detector, generating the first instruction.

2. The street lamp integration device according to claim 1, wherein the controller is further configured for, if a vehicle in the first range matches a first condition, determining to connect the vehicle to the local area network.

3. The street lamp integration device according to claim 2, wherein the controller is further configured for receiving the traffic information collected by the traffic collector, and sending the traffic information to the communication device.

4. The street lamp integration device according to claim 3, wherein,
   the communication device is further configured for receiving a first request to obtain the traffic information sent by the vehicle connected to the local area network, and sending the first request to the controller;
   the controller is further configured for receiving the first request sent by the communication device, and generating the first instruction based on the first request.

5. The street lamp integration device according to claim 3, wherein the detector is further configured for detecting a speed of a vehicle in the first range, and sending the speed of the vehicle to the controller;
   the controller is further configured for, if the speed of the vehicle is smaller than a speed threshold, determining to connect the vehicle to the local area network.

6. The street lamp integration device according to claim 5, wherein the communication device is further configured for receiving a second request to be connected to the local area network sent by the vehicle in the first range, and sending the second request to the controller;

the controller is further configured for generating a second instruction to detect a speed of the vehicle based on the second request, and sending the second instruction to the detector, so as to enable the detector to detect the speed of the vehicle based on the second instruction.

7. The street lamp integration device according to claim 5, wherein the controller is further configured for, after connecting a first vehicle and a second vehicle to the local area network, if it is determined that the first vehicle and the second vehicle meet a second condition, establishing a communication connection between the first vehicle and the second vehicle.

8. The street lamp integration device according to claim 7, wherein the controller is further configured for generating a third instruction to detect a distance between the first vehicle and the second vehicle, and sending the third instruction to the detector;

the detector is further configured for detecting a distance between the first vehicle and the second vehicle based on the third instruction sent by the controller, and sending the distance between the first vehicle and the second vehicle to the controller, so as to enable the controller to determine whether the first vehicle and the second vehicle meet the second condition based on the distance between the first vehicle and the second vehicle and the speeds thereof.

9. The street lamp integration device according to claim 8, wherein the communication device is further configured for receiving a third request to establish a communication connection with the second vehicle connected to the local area network sent by the first vehicle connected to the local area network, and sending the third request to the controller; wherein the third request contains an identification of the second vehicle.

10. The street lamp integration device according to claim 5, wherein the detector is further configured for, based on a fourth instruction to obtain an identification of a vehicle connected to the local area network sent by the controller, detecting the identification of the vehicle connected to the local area network, and sending the identification to the controller;

the controller is configured for sending the fourth instruction to the detector and sending the identification sent by the detector to the communication device.

11. The street lamp integration device according to claim 10, wherein the controller is further configured for, if the vehicle is connected to the local area network, generating the fourth instruction;

the communication device is further configured for broadcasting all identifications sent by the controller in the local area network.

12. The street lamp integration device according to claim 10, wherein the communication device is further configured for receiving a fourth request to obtain an identification of a vehicle connected to the local area network sent by a third vehicle, and sending the fourth request to the controller; sending the identification sent by the controller to the third vehicle;

the controller is further configured for, before sending the fourth instruction to the detector, generating the fourth instruction based on the fourth request sent by the communication device.

13. The street lamp integration device according to claim 1, wherein the street lamp integration device communicates with a device in a wide area network through the wide area network.

14. The street lamp integration device according to claim 1, wherein the traffic collector is arranged at a position of the street lamp close to the top of the street lamp, and the traffic collector comprises a camera.

15. A street lamp system, comprising: a plurality of street lamps, a plurality of street lamp integration devices as claimed in claim 1 mounted on the plurality of street lamps respectively, first ranges covered by local area networks of adjacent ones of the street lamp integration devices adjoin or at least partly coincide, second ranges which can be collected by the traffic collectors of adjacent ones of the street lamp integration devices adjoin or at least partly coincide, and communication can be performed between any two of the street lamp integration devices.

16. A communication method performed by a street lamp integration device, wherein the communication method comprises:

generating a local area network that covers a first range;

connecting a vehicle in the first range to the local area network;

collecting traffic information in a second range; and sending the traffic information to the vehicle connected to the local area network; and wherein the collecting traffic information in a second range comprises:

detecting heights of all vehicles in the first range according to a preset frequency; and collecting the traffic information in the second range if it is determined that a height of at least one vehicle is higher than a height threshold based on detected heights of all vehicles.

17. The communication method according to claim 16, wherein the connecting a vehicle in the first range to the local area network comprises:

determining to connect a first vehicle and a second vehicle in the first range to the local area network if the first vehicle and the second vehicle match a first condition, and after connecting the first vehicle and the second vehicle to the local area network, establishing a communication connection between the first vehicle and the second vehicle if it is determined that the first vehicle and the second vehicle meet a second condition.

18. The communication method according to claim 17, further comprising detecting speeds of the first vehicle and the second vehicle in the first range, and the first condition being that the speeds of the first vehicle and the second vehicle are smaller than a speed threshold; and after connecting the first vehicle and the second vehicle to the local area network, detecting a distance between the first vehicle and the second vehicle, and determining whether the first vehicle and the second vehicle meet the second condition based on the distance between the first vehicle and the second vehicle and the speeds thereof.

\* \* \* \* \*